(12) United States Patent
Smith et al.

(10) Patent No.: US 9,004,366 B2
(45) Date of Patent: Apr. 14, 2015

(54) WIRELESS DEVICES INCLUDING PRINTED INTEGRATED CIRCUITRY AND METHODS FOR MANUFACTURING AND USING THE SAME

(75) Inventors: Patrick Smith, San Jose, CA (US); Criswell Choi, Menlo Park, CA (US); Vikram Pavate, San Mateo, CA (US); James Montague Cleeves, Redwood City, CA (US); Vivek Subramanian, Orinda, CA (US); Richard Young, Los Gatos, CA (US); Vince Biviano, San Jose, CA (US)

(73) Assignee: Thin Film Electronics ASA, Oslo (NO)

( * ) Notice: Subject to any disclaimer, the term of this patent is extended or adjusted under 35 U.S.C. 154(b) by 17 days.

(21) Appl. No.: 12/249,707

(22) Filed: Oct. 10, 2008

(65) Prior Publication Data

US 2009/0095818 A1    Apr. 16, 2009

Related U.S. Application Data

(60) Provisional application No. 60/979,057, filed on Oct. 10, 2007, provisional application No. 60/980,581, filed on Oct. 17, 2007.

(51) Int. Cl.
  *G06K 19/06* (2006.01)
  *G08B 13/14* (2006.01)
  (Continued)

(52) U.S. Cl.
  CPC ...... *G06K 19/07749* (2013.01); *G06K 19/0775* (2013.01)

(58) Field of Classification Search
  USPC .......... 235/492, 482; 340/10.1, 572.1–572.9; 438/455; 257/679
  See application file for complete search history.

(56) References Cited

U.S. PATENT DOCUMENTS

| 5,528,222 A | 6/1996 | Moskowitz et al. |
| 6,100,804 A | 8/2000 | Brady et al. |

(Continued)

FOREIGN PATENT DOCUMENTS

| EP | 1952316 B1 | 6/2008 |
| JP | 2005-228298 A | 8/2005 |

OTHER PUBLICATIONS

Office Action, Japanese Pat. Appl. No. 2010-529125, mailed from the Japan Patent Office on Feb. 20, 2013.

(Continued)

*Primary Examiner* — Michael G Lee
*Assistant Examiner* — Laura Gudorf
(74) *Attorney, Agent, or Firm* — Andrew D. Fortney; Central California IP Group, P.C.

(57) ABSTRACT

Printed integrated circuitry and attached antenna and/or inductor for sensors, electronic article surveillance (EAS), radio frequency (RF) and/or RF identification (RFID) tags and devices, and methods for its manufacture. The tag generally includes printed integrated circuitry on one carrier and an antenna and/or inductor on another carrier, the integrated circuitry being electrically coupled to the antenna and/or inductor. The method of manufacture generally includes of printing an integrated circuit having a plurality of first pads on a carrier, forming an antenna and/or inductor having a plurality of second pads on a substrate, and attaching at least two of the first pads of the printed integrated circuit to corresponding second pads of the antenna and/or inductor. The present invention advantageously provides a low cost RFID tag capable of operating at MHz frequencies that can be manufactured in a shorter time period than conventional RFID tags that manufacture all active electrical devices on a conventional wafer.

36 Claims, 5 Drawing Sheets

(51) Int. Cl.
*H01L 21/30* (2006.01)
*H01L 23/02* (2006.01)
*G06K 19/077* (2006.01)

(56) References Cited

U.S. PATENT DOCUMENTS

| | | | |
|---|---|---|---|
| 6,509,217 B1 | 1/2003 | Reddy | |
| 6,693,541 B2 | 2/2004 | Egbert | |
| 6,891,110 B1 | 5/2005 | Pennaz et al. | |
| 6,951,596 B2 | 10/2005 | Green et al. | |
| 7,292,148 B2 | 11/2007 | Forster | |
| 7,307,527 B2 | 12/2007 | Forster | |
| 7,359,823 B2 | 4/2008 | Forster | |
| 7,413,124 B2 | 8/2008 | Frank et al. | |
| 2005/0130389 A1* | 6/2005 | Yamazaki et al. | 438/455 |
| 2005/0134463 A1 | 6/2005 | Yamazaki | |
| 2005/0136358 A1* | 6/2005 | Paul et al. | 430/311 |
| 2005/0198811 A1 | 9/2005 | Kurz et al. | |
| 2006/0145710 A1* | 7/2006 | Puleston et al. | 324/750 |
| 2006/0226238 A1* | 10/2006 | Salib et al. | 235/492 |
| 2006/0254440 A1* | 11/2006 | Choi et al. | 101/180 |
| 2006/0270191 A1* | 11/2006 | Tamura et al. | 438/458 |
| 2007/0090955 A1 | 4/2007 | Cote et al. | |

OTHER PUBLICATIONS

Maekawa et al., "Semiconductor Apparatus and Method for Manufacturing the Same", Patent Abstracts of Japan, Japanese Patent Publication No. 2005-228298, Aug. 25, 2005, http://www.19.ipdl.inpit.go.jp/PA1?result/detail/main/wn4idaaDA417228298P1.htm.

Chinese Office Action with English translation dated Feb. 13, 2012; Chinese Patent Application No. 200880111167.8; 7 pages total; The State Intellectual Property Office of the P.R.C., People's Republic of China.

International Preliminary Report on Patentability, International Pat. Appl. No. PCT/US2008/079653, mailed from the IPEA/US on Mar. 22, 2013.

Patrick Smith, Criswell Choi, Vikram Pavate, James Montgue Cleeves, Vivek Subramanian, Vince Biviano and Richard Young; "Wireless Devices Including Printed Integrated Circuitry and Methods for Manufacturing and Using the Same"; International Search Report, PCT Application No. PCT/US 08/79653; 2 pages; International Searching Authority/United States, Commissioner for Patents, Alexandria, Virginia, Dec. 18, 2008.

Patrick Smith, Criswell Choi, Vikram Pavate, James Montgue Cleeves, Vivek Subramanian, Vince Biviano and Richard Young; "Wireless Devices Including Printed Integrated Circuitry and Methods for Manufacturing and Using the Same"; Written Opinion, PCT Application No. PCT/US 08/79653; 5 pages; International Searching Authority/United States, Commissioner for Patents, Alexandria, Virginia, Dec. 18, 2008.

Office Action from Korean Intellectual Property Office with partial English translation in Korean Patent Application No. 10-2010-7007755 dated Jan. 29, 2015; 13 pgs.

* cited by examiner (Background)

(Background)

WIRELESS DEVICES INCLUDING PRINTED INTEGRATED CIRCUITRY AND METHODS FOR MANUFACTURING AND USING THE SAME

RELATED APPLICATIONS

This application claims the benefit of U.S. Provisional Application No. 60/979,057, filed Oct. 10, 2007, and U.S. Provisional Application No. 60/980,581, filed Oct. 17, 2007, both of which are incorporated herein by reference in their entireties.

FIELD OF THE INVENTION

The present invention generally relates to the field of sensors and electronic article surveillance (EAS), radio frequency (RF) and/or RF identification (RFID) tags and devices. More specifically, embodiments of the present invention pertain to tags/devices utilizing printed integrated circuitry with an attached antenna, typically EAS, RF and/or RFID tags and devices, and methods for their manufacturing and/or production. As a result, the present invention may provide a low-cost process for producing an RFID (or EAS) tag comprising printed integrated circuitry and an antenna.

BACKGROUND OF THE INVENTION

Remotely powered electronic devices and related systems are known. For example, U.S. Pat. No. 5,099,227, issued to Geiszler et al. and entitled "Proximity Detecting Apparatus," discloses a remotely powered device which uses electromagnetic coupling to derive power from a remote source, then uses both electromagnetic and electrostatic coupling to transmit stored data to a receiver, often collocated with the remote source. Such remotely powered communication devices are commonly known as radio frequency identification ("RFID") tags.

RFID tags and associated systems have numerous uses. For example, RFID tags are frequently used for personal identification in automated gate sentry applications, protecting secured buildings or areas. These tags often take the form of access control cards. Information stored on the RFID tag identifies the tag holder seeking access to the secured building or area. Older automated gate sentry applications generally require the person accessing the building to insert or swipe their identification card or tag into or through a reader for the system to read the information from the card or tag. Newer RFID tag systems allow the tag to be read at a short distance using radio frequency data transmission technology, thereby eliminating the need to insert or swipe an identification tag into or through a reader. Most typically, the user simply holds or places the tag near a base station, which is coupled to a security system securing the building or area. The base station transmits an excitation signal to the tag that powers circuitry contained on the tag. The circuitry, in response to the excitation signal, communicates stored information from the tag to the base station, which receives and decodes the information. The information is then processed by the security system to determine if access is appropriate. Also, RFID tags may be written (e.g., programmed and/or deactivated) remotely by an excitation signal, appropriately modulated in a predetermined manner.

Some conventional RFID tags and systems use primarily electromagnetic coupling to remotely power the remote device and couple the remote device with an exciter system and a receiver system. The exciter system generates an electromagnetic excitation signal that powers up the device and causes the device to transmit a signal which may include stored information. The receiver receives the signal produced by the remote device.

These conventional RFID tags are manufactured such that the integrated circuitry is manufactured separately from the antenna and/or inductor, and the two components are then physically and electrically connected. These components are manufactured separately, in part, due to the cost of manufacturing silicon wafers. It would be cost prohibitive to manufacture both components on a silicon wafer. The antenna and/or inductor is a simple structure and can be manufactured on a less expensive substrate using less expensive processing methods and joined to the integrated circuitry in a later manufacturing step.

Referring to FIG. 1A, conventional RFID tags are formed by a process that includes dicing a wafer manufactured by conventional wafer-based processes into a plurality of die. A die is then placed onto an antenna or inductor carrier (which may contain an antenna, inductor coil or other conducting feature) in a chip-to-antenna attach process. Alternately, the die can be attached to an intermediate carrier (or interposer) in a two-step chip-to-strap/strap-to-antenna attach process.

In the two-step process, a die 120 is attached to an interposer (or carrier) 140. Electrical paths 130 and 132 from the die 120 to relatively larger and/or more widely distributed areas (e.g., 134 or 136) for attaching ends of the antenna are present in certain locations on the interposer 140. This assembly may then be attached, as shown in FIG. 1B to a support film 150 containing inductor/antenna 152. Because the pads 134 and 136 (together with the paths 130 and 132 and the die 120) connect the ends of the antenna 152, the assembly on the interposer 140 is sometimes known as a "strap." This attach process may include various physical bonding techniques, such as gluing, as well as establishing electrical interconnection(s) via wire bonding, anisotropic conductive epoxy bonding, ultrasonics, bump-bonding or flip-chip approaches. Also, the attach process often involves the use of heat, time, and/or UV exposure. Since the die 120 is usually made as small as possible (<1 mm$^2$) to reduce the cost per die, the pad elements for external electrical connections to the die 120 may be relatively small. This means that the placing operation should be of relatively high accuracy for high speed mechanical operation (e.g., placement to within 50 microns of a predetermined position is often required).

As a whole, the process of picking out a separated (sawn) die, moving it to the right place on the antenna(e), inductor, carrier, or interposer to which it is to be bonded, accurately placing it in its appropriate location, and making the physical and electrical interconnections can be a relatively slow and expensive process. In the case of processes that use an intermediate interposer, cost and throughput advantages are achieved by first attaching the die to a roll of interposer carriers, which can be done quickly and sometimes in parallel, as they are generally closely spaced and other novel placement operations such as fluidic self-assembly or pin bed attachment processes can be done more easily. The carriers generally contain electrical paths from the die to relatively larger and/or more widely distributed areas in other locations on the carrier to allow high-throughput, low resolution attachment operations such as crimping or conductive adhesive attach (somewhat functionally similar to a conventional strap, as compared to a pick-and-place and/or wire bonding based process for direct integration of a chip die to an inductor substrate). In some cases, low resolution attach processes suitable for straps could be performed at costs near $0.003 or less, based on commercially available equipment and materials (e.g., a Mühlbauer TMA 6000 or similar apparatus).

The carriers are then attached to an inductor/antenna 152 such that electrical connections are formed at such other locations. This carrier-based process may also have advantages for flip-chip or bump bonding approaches, where it may be more expensive or disadvantageous to implement the required stubs, bumps or other interconnect elements onto the larger inductor/carrier substrate 150 by conventional means (e.g., wire bonding).

Conventional RFID manufacturing processes, as described above, require the use of either a highly-complex chip-to-antenna attach process or a two-step chip-to-strap/strap-to-antenna attach process. Either process requires high-precision pick-and-place equipment for the chip attach. The high precision pick-and-place equipment has a relatively high capital cost and is typically slower than lower precision equipment. As a result, the conventional attach process has a proportionately high cost relative to the overall manufacturing cost.

The price of tags is a significant focus within the RFID industry. High RFID tag prices have been an obstacle against widespread adoption of RFID technology, especially in item-level retail applications and other low-cost, high-volume applications. One way of reducing tag costs is to develop a tag structure and process that incorporates (and preferably integrates) a less expensive substrate, a stable and effective antenna, RF front end devices, and high resolution patterned logic circuitry.

SUMMARY OF THE INVENTION

Embodiments of the present invention relate to sensor, EAS, RF and/or RFID tags and devices having printed integrated circuitry and an affixed antenna and/or inductor, and methods for their manufacture and use. The device generally comprises: (a) printed integrated circuitry on a first substrate; (b) first and second pads on the first substrate and/or the printed integrated circuitry, electrically coupled to the printed integrated circuitry; and (c) an antenna and/or inductor on a second substrate comprising a conductive line having first and second ends thereon, the first and second ends being in electrical communication with the first and second pads, respectively. The method of manufacturing a device generally comprises the steps of: (1) forming printed integrated circuitry on a first substrate; (2) forming first and second pads electrically coupled to the printed integrated circuitry; (3) forming an antenna and/or inductor having first and second ends on a second substrate; and (4) attaching the first and second pads to first and second ends of the antenna and/or inductor. The method of manufacturing multiple devices generally comprises the steps of: (i) forming a plurality of printed integrated circuits on a first substrate stock to form a PIC stock; (ii) forming a plurality of antennas and/or inductors on a second substrate stock to form an antenna stock; and (iii) attaching the PIC stock to the antenna stock. The method of use generally comprises the steps of (i) causing or inducing a current in the present device sufficient for the device to radiate, reflect or modulate detectable electromagnetic signals; (ii) detecting the detectable electromagnetic radiation; and optionally, (iii) processing information conveyed by the detectable electromagnetic radiation. Optionally, the method of use may further comprise the step of (iv) transporting or transmitting information from the present device (or sensor) back to a reading device.

One potential approach to producing very low-cost RFID tags may use printing techniques in a roll- or sheet-fed process. Printing has potential cost advantages, since it can increase materials utilization (e.g., additive or semi-additive processing), combine deposition and patterning steps, and leverage low capital expenditures and operating costs for equipment. Furthermore, high throughput conventional printing processes can be adapted to flexible substrates (e.g., a plastic sheet or a metal foil), improving and/or expanding tag uses in a number of applications. The materials efficiency and additive processing approaches enables a lower cost per unit area of processed carriers (or die, when used), which enables low cost attach processing and/or integration of passive devices with the active circuitry. Also, mask-less processes such as printing enable facile customization of RF devices, for example where each individual RF device is provided with a unique identification code and/or a unique response time delay with respect to a reader inquiry. Furthermore, if circuitry can be printed in a manner that facilitates the attachment of the printed integrated circuitry to an antenna and/or inductor, the cost of the attach steps can be reduced significantly.

The use of printing processes to form integrated circuitry on a carrier enables the manufacture of larger integrated circuitry while reducing costs over conventional manufacturing processes. The incentive to manufacture smaller integrated circuits is diminished and cost limitations associated with the cost of attach become prevalent. This approach diverges from the conventional semiconductor wafer cost reduction approach of reducing die cost by decreasing die size (although this approach may become self-limiting for direct-attached silicon RFID tags, as the attach costs increase for smaller die).

By using a carrier-based process, some or all conventional thin film display and photovoltaic materials processing is possible. Photovoltaic materials processing includes well-developed roll-to-roll manufacturing processes for inorganic semiconductors, dielectrics and other films on foils, sheets and/or other flexible substrates. Such processing provides an effective way to make RFID tags with equipment for processing display and photovoltaic devices (by itself or alternatively, in combination with printing steps that may enable a full manufacturing process without necessarily having a full tool and materials set developed for printed RFID tags). Ultimately, however, such processing preferably includes spool-based and/or roll-to-roll printing processes, which should drive the manufacturing costs even lower due to the lower capital equipment costs, the high throughput (several hundreds of $m^2/hr$), the increased efficiency in materials usage, and/or the decreased number of processing steps.

The present invention advantageously provides a low cost sensors, electronic article surveillance (EAS), radio frequency (RF) and/or RF identification (RFID) tag and devices utilizing printed integrated circuitry with an attached antenna. By reducing the number of expensive and/or low throughput attachment steps, as well as reducing the cost of fabricating the active electronics, a low cost tag may be produced by directly printing or otherwise forming the circuitry on a substrate that is then relatively cheaply attached at relatively low accuracy to an antenna and/or inductor formed on a separate and potentially less expensive substrate. These and other advantages of the present invention will become readily apparent from the detailed description of preferred embodiments below.

DETAILED DESCRIPTION OF THE PREFERRED EMBODIMENTS

Figure 1A:
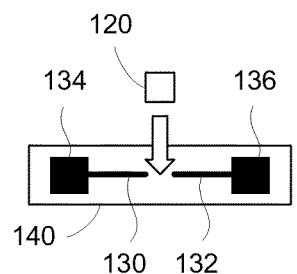
FIGS. 1A-1B show steps in a conventional process for manufacturing RFID tags involving attachment of a conventional semiconductor die to an antenna using an interposer.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "coupled to," "connected to," and "in communication with" mean direct or indirect coupling, connection or communication unless the context indicates otherwise. These terms are generally used interchangeably herein, but are generally given their art-recognized meanings. Also, for convenience and simplicity, the terms "RF," "RFID," and "identification" may be used interchangeably with respect to intended uses and/or functions of a device and/or tag, and the term "tag" or "device" may be used herein to refer to any RF and/or RFID sensor, tag and/or device. Also, the terms "integrated circuitry" and "printed integrated circuitry" refer to a unitary structure comprising a plurality of electrically active devices formed from a plurality of conductor, semiconductor and insulator thin films, but generally does not include discrete, mechanically attached components (such as die, wire bonds and leads, the carrier, or an antenna and/or inductor component), or materials having primarily an adhesive function. The term "antenna" may be used in a general context to refer to an antenna, an inductor, or an antenna and inductor. Further, the terms "interposer", "carrier" and/or "substrate" refer to a structure that may be used as a support for additional structures including printed integrated circuitry and/or an antenna and/or inductor. In addition, the terms "item," "object" and "article" are used interchangeably, and wherever one such term is used, it also encompasses the other terms. In the present disclosure, a "major surface" of a structure or feature is a surface defined at least in part by the largest axis of the structure or feature (e.g., if the structure is round and has a radius greater than its thickness, the radial surface[s] is/are the major surface of the structure).

The present invention concerns devices having printed integrated circuitry and an attached antenna and/or inductor, typically including sensor, EAS, RF and/or RFID tags and devices, comprising (a) printed integrated circuitry on a first substrate; (b) first and second pads on the first substrate and/or the printed integrated circuitry, electrically coupled to the printed integrated circuitry; and (c) an antenna and/or inductor on a second substrate comprising a conductive line having first and second ends thereon, the first and second ends being in electrical communication with first and second pads, respectively. In various embodiments, the substrate for the printed integrated circuit and/or the antenna and/or inductor may comprise a glass, a polyimide, a glass/polymer laminate, a high-temperature polymer, or a metal foil.

In a further aspect, the present invention concerns a method of manufacturing a device, generally comprising the steps of (1) forming a printed integrated circuit on a first substrate; (2) forming first and second pads electrically coupled to the printed integrated circuitry; (3) forming an antenna and/or inductor having first and second ends on a second substrate; and (4) attaching the first and second pads to the first and second ends of the antenna and/or inductor. In various embodiments, the process used to attach of the pads of the integrated circuit to the corresponding pads on the antenna may comprise either gluing, bump-bonding, ultrasonic bonding, welding, soldering, and/or crimping.

Even further aspects of the present invention concern a method of manufacturing radio frequency identification devices, generally comprising the steps of (A) forming a plurality of printed integrated circuits on a first substrate stock to form PIC stock; (B) forming a plurality of antennas and/or inductors on a second substrate stock to form antenna stock; (C) attaching the PIC stock to the antenna stock. In various embodiments, the process used to attach the PIC stock to the antenna stock comprises a sheet-to-sheet process, a roll-to-roll process, a pick-and-place process, and/or a tape-and-reel process.

Another aspect of the present invention concerns a method for using a radio frequency identification device generally comprising the steps of (i) causing or inducing a current in the present device sufficient for the device to radiate, reflect or modulate detectable electromagnetic signals; (ii) detecting the detectable electromagnetic radiation; and optionally, (iii) processing information conveyed by the detectable electromagnetic radiation. Optionally, the method of use may further comprise the step of (iv) transporting or transmitting information from the present device (or sensor) back to a reading device.

The invention, in its various aspects, will be explained in greater detail below with regard to exemplary embodiments.

Exemplary Tags and/or Devices

One aspect of the invention relates to an RF identification or other wireless device, comprising (a) printed integrated circuitry on a first substrate; and (b) first and second pads on the first substrate and/or the printed integrated circuitry, the first and second pads electrically coupled to the printed integrated circuitry; and (c) an antenna and/or inductor on a second substrate having a first and second ends, the first and second ends being in electrical communication with the first and second pads, respectively. As a result, the present invention provides a low-cost RFID (or EAS) tag (which may also include sensors, the signal modulation activities of which generally change as a result of certain external changes in the environment [e.g., temperature, conductivity of the structure or surface to which the sensor is attached, etc.], and active RF or wireless circuits and/or devices; e.g., tags with a battery on board) comprising a substrate (e.g., a carrier), an inductor/antenna, and an RF front end (or subset of an RF front end and logic circuit) fully capable of operating in accordance with modern wireless or RFID standards.

Figure 3A:
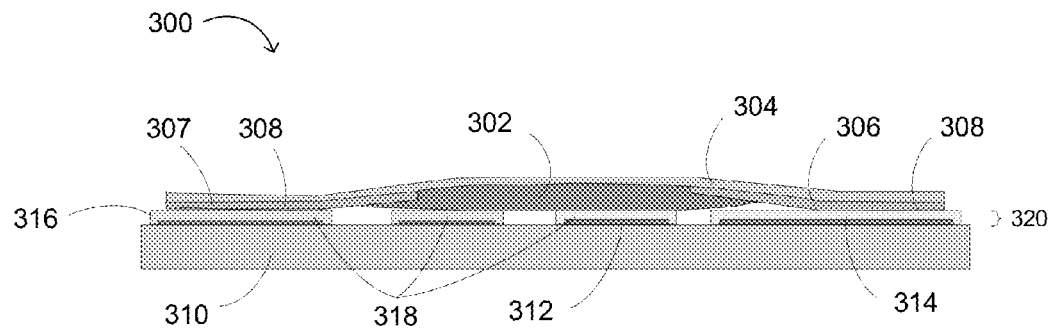
FIGS. 3A-3B show cross-sectional views of the carrier with printed integrated circuitry thereon, attached to the antenna and/or inductor, with the printed integrated circuitry in a face-down and face-up orientation, respectively.

A device in accordance with an embodiment of the invention is shown in FIG. 3A. The device 300 comprises a printed integrated circuit carrier (or PIC carrier) and an antenna and/or inductor carrier (or antenna carrier) attached together. The PIC carrier comprises a printed integrated circuit 302 formed on a first substrate 304. The substrate has electrical paths/pads 306 and 307 in electrical communication with printed integrated circuit 302. In this embodiment, electrical paths 306/307 are formed at least in part on the substrate 304 and put on the printed integrated circuit 302. Alternately, electrical paths/pads 306/307 can be formed solely on printed integrated circuit 302 or on printed integrated circuit 302 and substrate 304. The antenna carrier comprises substrate 310 and antenna and/or inductor 320. In this embodiment, the antenna and/or inductor comprise a bulk conductive layer 318 on a seed layer 312. Alternately, and preferably, the antenna and/or inductor 320 can be printed on substrate 310. In the embodiment shown on FIG. 3A, the top (PIC side) of the PIC carrier is in contact with the top (antenna side) of the antenna carrier and first and second electrical paths/pads 306/307 are in contact with first and second antenna and/or inductor ends 314/316, respectively. Adhesive 308 is used to affix electrical paths/pads 306/307 to the first and second antenna and/or inductor ends 314/316.

Figure 3B:
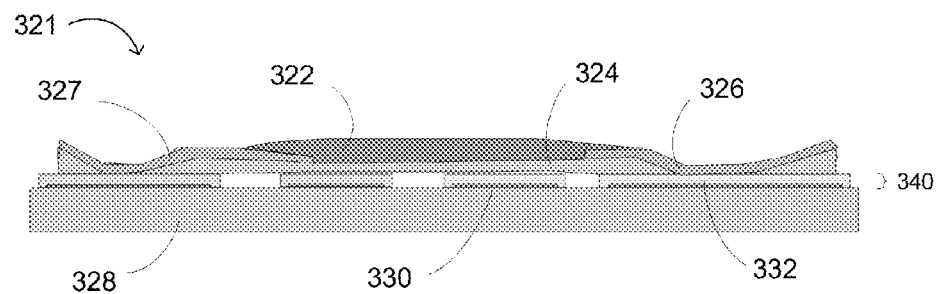

In another embodiment of the invention, shown in FIG. 3B, the bottom (substrate side) of the PIC carrier is in contact with the top of the antenna carrier. In this embodiment, electrical paths/pads 326/327 are in contact with antenna and/or inductor 340 through holes in substrate 324.

Some other embodiments with this orientation include embodiments where the bottom of the PIC carrier is used in lieu of electrical paths 326 and 327 and corresponding holes in substrate 324. In these other embodiments, substrate 324 comprises a metal which is selectively removed to form electrically conductive structures or pads that are isolated from each other. These other embodiments typically have an uppermost cap or passivation layer on the top of the PIC carrier. The pads may be formed from substrate 324 using a process similar to that used for forming antennas and/or inductors from a metal substrate (see e.g., U.S. patent application Ser. No. 11/452,108, filed on Jun. 12, 2006, the relevant portions of which are incorporated herein by reference).

Substrate 304 for printed integrated circuit 302 may comprise any substrate capable of (i) providing physical support of the integrated circuitry formed thereon during formation thereof and for the antenna and/or inductor component attached thereto during attachment thereof, (ii) having integrated circuitry formed (preferably printed) thereon, and (iii) enabling electrical connections to be formed therethrough (i.e., so that signals can be transmitted between integrated circuitry formed on one substrate and the antenna and/or inductor formed on another substrate). The substrate may be flexible, inflexible or rigid. The substrate can be conductive (electrically active) or non-conductive (electrically inactive), electrically active referring to the properties of the substrate and not necessarily the interaction between the substrate and the printed integrated circuit.

The substrate generally has a size that can be cost-effectively processed using conventional thin film processes and/or emerging or state-of-the-art printing processes, to produce low-cost RF circuits. Integrated circuitry can be formed on a flexible substrate such as polyimide, glass/polymer laminate, high temperature polymer, or metal foil, all of which may further include one or more barrier coats. Carriers manufactured from such substrates are generally substantially less expensive than a conventional silicon die of similar size. (However, a conventional RFID interposer typically has a size on the order of 1 cm$^2$ in area, as compared to a conventional silicon RFID die, which might be about 0.01 cm$^2$ or less in area.)

It may be advantageous to use an anodized Al, Al/Cu, Cu, stainless steel or similar metal foil as the substrate. Such materials may serve as an interconnect, an electrode and/or a dielectric for large storage or IC resonance capacitors, inductors and/or as an electrode for a diode, MOS-device or FET, or as a write once read many (WORM), one-time programmable (OTP), deactivation or other memory storage element. Examples of such substrates can be found in U.S. Pat. Nos. 7,152,804 and 7,286,053, the relevant portions of each of which are incorporated herein by reference.

It also may be advantageous to use as the substrate for the printed integrated circuitry a flexible material that may be adapted to withstand relatively high-temperature processing (e.g., a temperature of 300° C., 350° C., 400° C., 450° C. or more, up to a temperature of 500° C., 600° C., or 1000° C., generally without significant deterioration or decrease in its mechanical and/or electrical properties). For example, the substrate may comprise a thin (50-200 micron) glass sheet or "slip," a glass/polymer laminate, a high temperature polymer (e.g., a polyimide, a polyethersulfone, polyethylene naphthalate [PEN], polyether ether ketone [PEEK], etc.), or a metal foil such as aluminum, stainless steel or copper. Exemplary thicknesses depend on the material used, but in general, range from about 25 µm to about 200 µm (e.g., from about 50 µm to about 100 µm).

Preferably, the substrate is conventionally cleaned and coated with a barrier material (such as silicon dioxide or aluminum oxide) before further processing. The coating step may comprise oxidation and/or anodization of a surface material of the substrate (e.g., a metal foil); deposition of a spin-on or fluid coated barrier film; sputtering, CVD, or spray coating a barrier material onto the substrate, or a combination of any of these processes (see, e.g., U.S. patent application Ser. No. 11/243,460, filed on Oct. 3, 2005, the relevant portion of which is incorporated herein by reference). To the extent the interposer comprises a metal sheet or foil, the metal foil may be etched and/or cut as described in U.S. patent application Ser. No. 11/452,108, filed on Jun. 12, 2006, and U.S. Pat. Nos. 7,286,053 and 7,152,804; the relevant portions of each of which are incorporated herein by reference.

Printed integrated circuit 302 may comprise integrated circuitry (e.g., complementary metal-oxide-semiconductor [CMOS] circuitry) and/or devices manufactured by printing one or more (preferably a plurality) of patterned layers on a substrate. Other layers may be printed or formed using other, more conventional techniques. Generally, the integrated circuitry may comprise a gate metal layer; one or more semiconductor layers (e.g., a transistor channel layer, a source/drain terminal layer, and/or one or more lightly- or heavily-doped diode layers); a gate insulator layer between the gate metal layer and at least one of the semiconductor layers; one or more capacitor electrodes (each of which is generally capacitively coupled to another capacitor electrode, which may also be part of the integrated circuitry or which may be integrated with or part of the carrier or antenna/inductor layer); a plurality of metal conductors in electrical communication with the gate metal layer, the source and drain terminals, an uppermost and/or lowermost diode layer and/or an uppermost and/or lowermost capacitor electrode; and/or a dielectric layer between various metal conductors and/or semiconductor layer(s). The integrated circuitry may further comprise one or more resistors, which may comprise a metal and/or lightly or heavily doped polysilicon. In one embodiment, the integrated circuitry comprises a gate metal layer, a semiconductor layer (e.g., a transistor channel layer in contact with source/drain terminals, in the same layer or an overlying or underlying layer in contact with the channel layer), a gate insulator layer between the gate metal layer and the transistor channel layer, and a plurality of metal conductors in electrical communication with the gate metal layer and the source and drain terminals. Exemplary layers of integrated circuitry are described in greater detail in U.S. patent application Ser. Nos. 11/084,448, 11/203,563, and 11/243,460, respectively filed on Mar. 18, 2005, Aug. 11, 2005, and Oct. 3, 2005, the relevant portions of each of which are incorporated herein by reference.

Substrate 310 for antenna and/or inductor 320 may comprise any substrate capable of (i) providing physical support of the antenna and/or inductor formed thereon during formation thereof and for the PIC carrier component attached thereto during attachment thereof, (ii) having the antenna and/or inductor formed (preferably printed) thereon, and (iii) enabling electrical connections to be formed therethrough (i.e., so that signals can be transmitted between integrated circuitry formed on one substrate and the antenna and/or inductor formed on another substrate). The substrate may be flexible, inflexible or rigid. The substrate can be conductive (electrically active) or non-conductive (electrically inactive), electrically active referring to the properties of the substrate and not the interaction between the substrate and the antenna and/or inductor. Generally, the antenna and/or inductor can be formed on the same materials as the printed integrated circuitry including polyimide, glass/polymer laminate, high temperature polymer, or metal foil, all of which may further include one or more barrier coats.

The antenna and/or inductor may comprise the antenna, the inductor, or both, and may further comprise a capacitor electrode coupled thereto or integrated therewith (see, e.g., U.S. Pat. Nos. 7,152,804 and 7,286,053. The antenna and/or inductor may comprise one or more layers and/or coils. Further, the antenna and/or inductor may be formed on one or both sides of the substrate (see, e.g., U.S. patent application Ser. No. 11/749,114, filed May 15, 2007, the relevant portions of which are incorporated herein by reference).

Generally, the antenna and/or inductor comprises a metal. In one embodiment, the metal may comprise or consist essentially of aluminum, silver, gold, copper, palladium, titanium, chromium, molybdenum, tungsten, cobalt, nickel, platinum, zinc, iron, etc., or metal alloys thereof, preferably silver or gold, or an alloy thereof. Alternately, the metal may comprise a foil of the aforementioned metals. In such cases (and where the antenna and/or inductor components made from the metal foil, on the one hand, and the integrated circuitry on the other hand are on opposite sides of the interposer), the method of making a RFID and/or EAS device (see the following section) may further comprise the step of removing from the metal foil one or more portions of the metal located under (or opposite) electrically active integrated circuitry (e.g., transistors and diodes, but not necessarily a capacitor electrode or plate that includes a portion of the metal foil as an electrode or plate).

In an embodiment comprising both an antenna and an inductor, the inductor may function as a tuning inductor (see, e.g., U.S. Pat. No. 7,286,053, the relevant portions of which are incorporated herein by reference). As a result, the metal forming the antenna and inductor may not be continuous (i.e., it may contain an electrical disconnection), and a surveillance and/or identification device in accordance with the invention may comprise a first (e.g., outer) inductor coupled to a first capacitor plate, a second (e.g., inner) inductor coupled to a second capacitor plate, a dielectric film on the first (outer) inductor, the second (inner) inductor, and the first and second capacitor plates, the first dielectric film having openings therein exposing ends of each of the first and second (e.g., outer and inner) inductors. In alternative embodiments, the capacitor plates may be linear or nonlinear, and/or the device may further comprise first and second nonlinear capacitor plates on the dielectric film, respectively coupled to the first and second linear capacitor plates.

The present device may also further comprise a support and/or backing layer (not shown) on a surface of the first and/or second carrier 310. The support and/or backing layer may be conventional, and are well known in the EAS and RFID arts (see, e.g., U.S. Pat. Appl. Publication No. 2002/0163434 and U.S. Pat. Nos. 5,841,350, 5,608,379 and 4,063,229). Generally, such support and/or backing layers provide (1) an adhesive surface for subsequent attachment or placement of the tag/device onto an article to be tracked or monitored, and/or (2) some mechanical support for the tag/device. For example, the present device may be affixed to the back of an identification label or price tag, and an adhesive coated or placed on the surface of the device opposite the identification label or price tag (optionally covered by a conventional release sheet until the label or tag is ready for use), to form a label or tag suitable for use in a conventional RFID system.

Exemplary Method(s) for Making an Exemplary Wireless and/or RFID Tag/Device

In one aspect, the present invention concerns a method for making an identification device, comprising the steps of: (1) forming printed integrated circuitry on a first substrate; (2) forming first and second pads electrically coupled to the printed integrated circuitry; (3) forming an antenna and/or inductor having first and second ends on a second substrate; and (4) attaching the first and second pads to the first and second ends of the antenna and/or inductor. Thus, the present method provides a cost-effective method for manufacturing RFID devices.

Figure 2A:
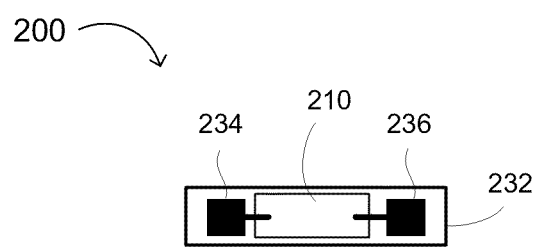
FIGS. 2A-2B show key steps in an exemplary process for manufacturing the present RFID tag/device involving attachment of a first carrier or substrate with printed integrated circuitry thereon to a second carrier or substrate containing an antenna thereon.
Figure 2B:
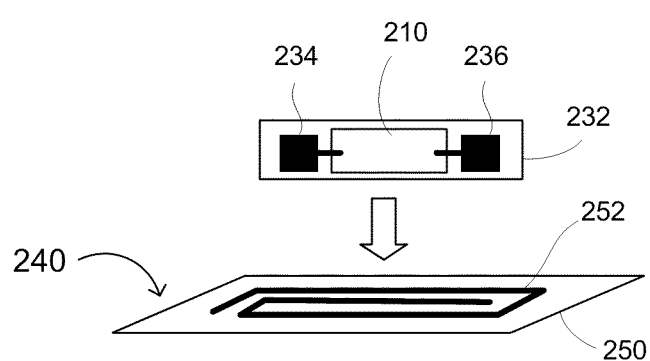

Conventional thin film processes, as well as conventional and/or state-of-the-art printing processes, are used to produce the printed integrated circuitry (e.g., 210 in FIG. 2B). These processes include sputtering, evaporation, LPCVD, PECVD, bath etching, dry etching, direct laser printing of device elements, ink jet printing of any element or layer, spray coating, blade coating, extrusion coating, photolithography, printed etch mask lithography of any layer (such as laser or inkjet), offset printing, gravure printing, embossing, contact printing, screen printing, combinations thereof, and/or other techniques. Nearly any layer of material in the integrated circuitry of the present invention can be made by essentially any of these techniques. For reference, see U.S. Pat. Nos. 7,152,804 and 7,286,053 and/or U.S. patent application Ser. Nos. 11/452,108, 11/818,078, 11/888,949, 11/888,942, and 11/842,884, filed on Jun. 12, 2006, Jun. 12, 2007, Aug. 3, 2007, Aug. 3, 2007, and Aug. 21, 2007, the relevant portions of each of which are incorporated herein by reference.

The ink used to produce the printed integrated circuitry may comprise a metal formulation for forming thin films. Such formulations enable the printing of a pure metal film using a metal precursor and reducing agent that generally does not leave substantially adverse levels of impurities and/or residues in the film. These ink formulation generally consists essentially of one or more Group 4, 5, 6, 7, 8, 9, 10, 11, or 12 metal salt(s) and/or metal complex(es), one or more solvents adapted to facilitate coating and/or printing of the formulation, and optionally, one or more additives that form gaseous or volatile byproducts upon reduction of the metal salt or metal complex to an elemental metal or alloy thereof. For additional details, see U.S. patent application Ser. No. 12/131,002, filed May 30, 2008, the relevant portions of which are incorporated herein by reference.

A first exemplary method for manufacturing the present RFID device is described below with reference to FIGS. 2A-2B. FIG. 2A shows tag precursor (or printed integrated circuit) 200, comprising substrate 232 and integrated circuitry 210. Generally, integrated circuitry 210 is formed on a first major surface of carrier 232.

Thereafter, pads 234 and 236 are formed on the same surface of substrate 232 as integrated circuitry 210, similar to the process for forming pads 134 and 136 in FIG. 1A. However, in the exemplary process of FIG. 2A, there are generally holes or vias present in the uppermost dielectric layer of integrated circuitry 210 (sometimes known as the passivation layer) to enable electrical communication with circuit elements therein (see U.S. patent application Ser. No. 11/243,460, filed on Oct. 3, 2005, the relevant portions of which are incorporated herein by reference). Pads 234 and 236 provide essentially the same function as pads 134 and 136 in FIG. 1A.

FIG. 2B shows an antenna and/or inductor carrier 240, comprising carrier 250 and an antenna and/or inductor 252. Generally, the antenna and/or inductor 252 is formed on a first major surface of carrier 250. The antenna and/or inductor 252 can be realized as an etched structure on a dielectric substrate, a plated structure, or a printed structure.

Figure 1B:
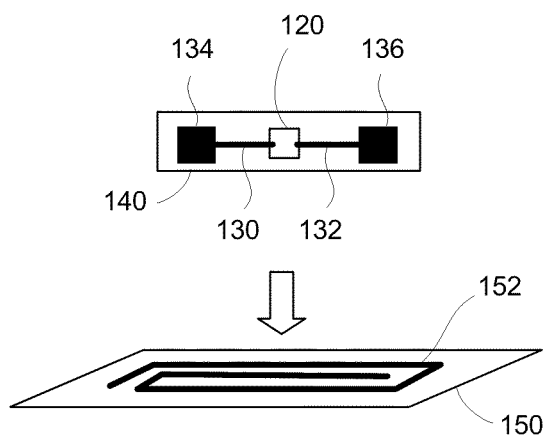

Next, holes or vias may be formed in the major surface of substrate 232 opposite that on which pads 234 and 236 and integrated circuitry 210 have been formed. Generally, and referring now to FIG. 2A, there are holes or vias through substrate 232 exposing a surface of pads 234 and 236 enabling electrical connection to a corresponding terminal of antenna/inductor 252. Generally, one hole/via is provided per pad and each hole/via is in a location and has dimensions enabling facile contact between one terminal of antenna/inductor 252 and the corresponding pad, using a relatively high-throughput, low resolution attachment operation (as compared to a pick-and-place operation or wire bonding process for integration of a die 120 to an inductor substrate 140; see FIG. 1B). Referring back to FIG. 2B, inductor and/or antenna 252 (which may be affixed to or positioned on carrier 250) is then attached or affixed to substrate 232 such that electrical connections are formed between pads 234 and 236 and terminals of antenna/inductor 252 at locations corresponding to the holes or vias in substrate 232.

In a second exemplary method, pads 234 and 236 are formed on the same surface of substrate 232 as integrated circuitry 210, as above. However, the substrate 232 and carrier 250 are aligned such that the top surface of the substrate 232 (the surface having the integrated circuitry 210) is facing the top surface of carrier 250 (the surface having the inductor and/or antenna 252). Generally, and referring now to FIG. 2B, the surface of pads 234 and 236 are aligned with a corresponding terminal of antenna/inductor 252, thus enabling an electrical connection thereto. Generally, pads 234 and 236 have dimensions enabling facile contact between one terminal of antenna/inductor 252 and the corresponding pad, using a relatively high-throughput, low resolution attachment operation. Referring back to FIG. 2B, inductor and/or antenna 252 (which may be affixed to or positioned on carrier 250) is then attached or affixed to substrate 232 such that electrical connections are formed between pads 234 and 236 and terminals of antenna/inductor 252 at locations corresponding to their relative locations on substrate 232.

The printed integrated circuit 200 and the carrier 250 can be attached or mounted in a variety of configurations as discussed herein. To electrically isolate the printed integrated circuitry from the antenna and/or inductor, a dielectric layer is formed over the printed integrated circuitry and/or the antenna and/or inductor. The dielectric layer may cover most or all of the surface of the carrier or the substrate, in which case openings for contact between the pads and the ends of the antenna and/or inductor may be provided to facilitate electrical contact. Alternately, the dielectric layer may be formed over the printed integrated circuitry 210 leaving a portion of the carrier or substrate including the pads uncovered by the dielectric layer. Similarly, the dielectric layer may be formed on the portion of the antenna and/or inductor 252 that may contact the printed integrated circuitry 200 leaving the ends of the antenna and/or inductor exposed to facilitate electrical contact.

In a further embodiment, the attachment step may comprise affixing the inductor and/or antenna 252 (which may be affixed to or printed or positioned on carrier 250) to substrate 232 using an adhesive such that pads 234 and 236 have an electrical connection to a corresponding terminal of antenna/inductor 252. A variety of adhesives may be used including anisotropic conductive paste (ACP), non-conductive paste (NCP), isotropic conductive paste (ICP), or glue with metal particles therein. In the case of NCP, the adhesive is not applied at the locations of contact between pads 232/234 and the ends of the antenna. To facilitate facile electrical connections, the pads or the ends of the antenna may have conductive/metal bumps thereon.

Thus, in further embodiments, the attachment step may comprise attaching the inductor and/or antenna 252 (which may be affixed to or positioned on carrier 250) to substrate 232 using a process such as bump-bonding, wire-bonding, or ultrasonic bonding. Alternatively, the attachment step may comprise attaching the inductor and/or antenna 252 (which may be affixed to or positioned on carrier 250) to substrate 232 using a process such as welding, soldering or crimping. In some embodiments, a short annealing step (which may further comprise applying pressure to the opposed major surfaces of substrate 232 and carrier 250) may secure the inductor and/or antenna 252 relatively reliably to the substrate 232.

Exemplary Method for Manufacturing RFID Devices

The present invention further relates to method of manufacturing radio frequency identification devices, generally comprising the steps of (A) forming a plurality of printed integrated circuits on a first substrate stock to form a PIC stock; (B) forming a plurality of antennas and/or inductors on a second substrate stock to form an antenna stock; and (C) attaching the PIC stock to the antenna stock. Novel elements of the invention may include printing directly onto a substrate, which is then quickly and inexpensively attached to an antenna and/or inductor formed on or from a low cost substrate material such as metal foil.

The manufacturing steps employed in this inventive approach are compatible with web, continuous, roll-to-roll and/or sheet processing and with conventional flexible, thin RF labels and should provide an increased throughput in the tag manufacturing process. Fabrication of circuit elements directly on a carrier enables low resolution pick and place processing (or other similar processing) for attaching the printed integrated circuit (and carrier) to the antenna carrier. The inventive approach also enables the efficient/low cost use of substrate materials for the antenna which are thermally and chemically compatible with RFID and/or EAS tag manufacturing and/or that provide appropriate barrier properties, but which otherwise might be too expensive if used for the substrate of an entire tag/device. As a result, the inventive approach may result in a high throughput and low cost process of manufacturing a RFID device/tag.

Figure 4A:
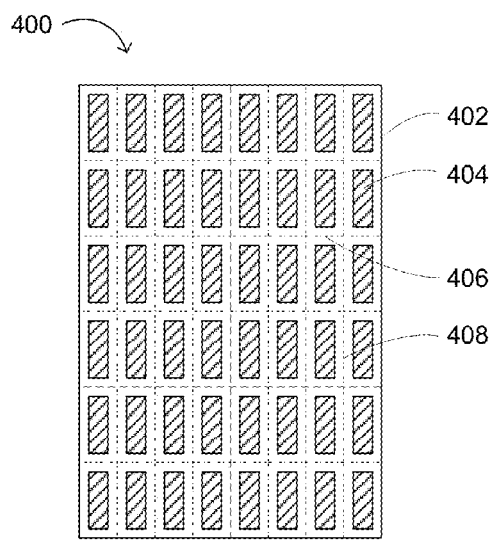
FIGS. 4A-4B show front and back views of exemplary printed integrated circuit sheet stock, or PIC sheet stock, respectively

A first exemplary method for manufacturing radio frequency identification devices is described below with reference to FIGS. 4A-4E. FIG. 4A shows a sheet of PIC stock, indicated by the general reference character 400. The PIC stock is created by forming a plurality of printed integrated circuits 404 on a first substrate stock 402, which is depicted as a sheet in this example. The printed integrated circuit may contain integrated circuitry, (e.g., CMOS circuitry) fabricated on the substrate using printing and ink technologies as described above.

The printed integrated circuits can generally be formed with the first substrate stock in any orientation. The dashed lines in FIG. 4A denote cross-sheet divisions 406 or down-sheet divisions 408. If the sheet is formed on a roll, the terms "cross-roll divisions" and "down-roll divisions" can still be employed. Cross-sheet (or cross-roll) divisions 406 and down-sheet (or down-roll) divisions 408 denote future divisions of the substrate, whether made during processing or at a future time. In some embodiments, the sheet or roll may be scored, perforated, or treated by other such similar process to define the division and/or facilitate later division of individual straps.

Figure 4B:
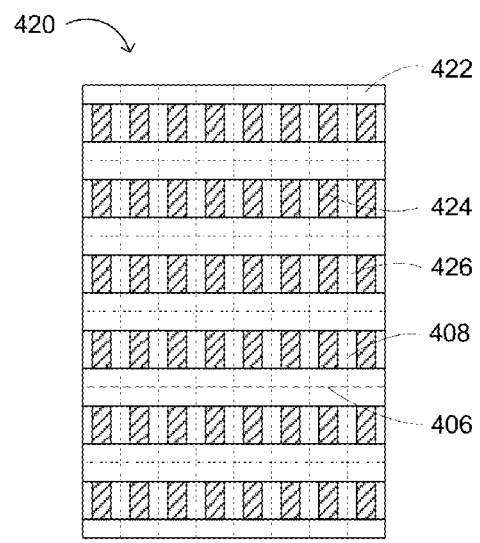

FIG. 4B is a view of the PIC stock from the reverse side, or the side opposite the printed integrated circuits. In this embodiment, the substrate (preferably comprising metal foil 422) has been removed in selected locations, allowing the remaining metal foil to be used as pads for the printed integrated circuit 424. Backing 426 is applied to the top, or printed integrated circuit side, of the PIC stock. Backing 426 may comprise a foil, a film, a sheet, or similar type material, and is typically electrically insulating. The film or sheet may be applied per se or as liquid material that is subsequently dried and/or cured to form the film or sheet.

Figure 4C:
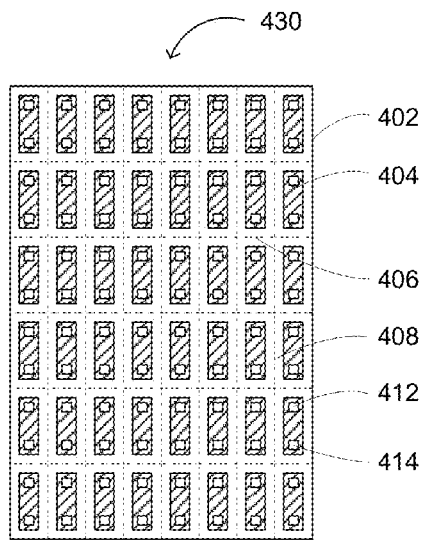
FIG. 4C shows an exemplary alternate embodiment of PIC sheet stock.
Figure 4D:
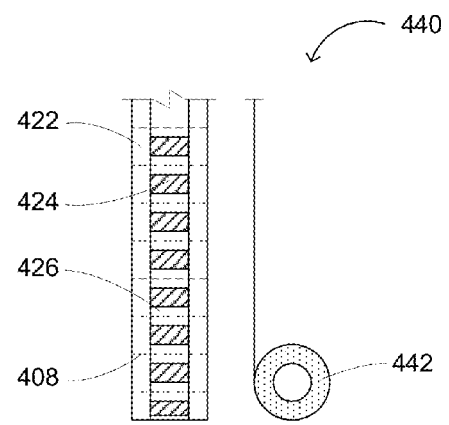
FIG. 4D shows front and side views of exemplary PIC roll stock.

An alternative embodiment of the PIC stock, denoted by the general reference character 430, is depicted in FIG. 4C. In this embodiment, pads 412, 414 are formed on each printed integrated circuit 404 and are located on the top side of the PIC stock.

The sheet may then be cut or otherwise divided into straps or carriers of a size optimized for handling by the attachment machine and matching target parameter values for a particular application. As an example, in an EAS or RFID tag application, the PIC size may be chosen to allow for convenient attachment to ends of an antenna on antenna stock. Thus pads 412, 414 may be separated by a distance about equal to the distance between the ends of the antenna.

The PIC stock can be divided, either by dividing the PIC stock at all or at selected cross-sheet divisions and/or down-sheet divisions using any process capable of such dividing/separating. A roll of PIC stock, denoted in FIG. 4D by the general reference character 440, can be formed from sheets of PIC stock or rolls of PIC stock. Such "n-by-1"/single row or column divisions of the PIC sheet stock can be applied to a backing tape and rolled up into a roll 442. The PIC stock roll can comprise any number of PICs and have a width and/or length corresponding to any unit number of PICs, although a roll one PIC wide is depicted in the figure. The roll 442 can comprise printed integrated circuits facing toward or away from the center of the roll. The orientation of the PICs on the roll and the size of the core of the roll may be designed to avoid stress or damage on the PICs.

Antennas are then formed on a separate substrate using any one of the previously described techniques for forming and/or printing antenna structures. The material(s) used for the substrate are selected to be thermally and chemically compatible with RFID and/or EAS tag manufacturing and/or possess appropriate barrier properties. The requirements for forming the antenna and subsequent processing (i.e. attach process) may enable the use of less expensive substrate materials than used for the printed integrated circuit substrate (thus providing an advantage over an integrated interposer comprising a printed integrated circuit and an antenna and/or inductor.

Next, the carriers are attached by any of the techniques described previously to the antenna substrate. Optionally, the carriers first may be picked up from the diced substrate sheet and converted into a roll of carriers to facilitate the subsequent attachment process. Since the carrier is size to enable convenient handling by the carrier attach machine, the cost of this process may be optimized to be acceptable low.

Figure 5:
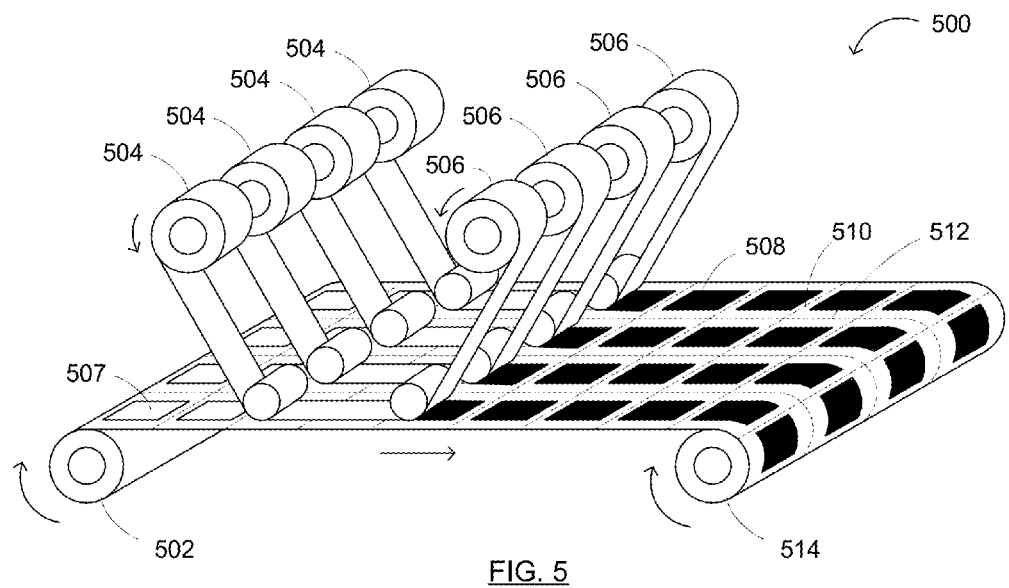
FIG. 5 shows an exemplary manufacturing process utilizing roll-to-roll processing.

In one embodiment of the manufacturing method shown in FIG. 5, a plurality of rolls of PIC stock are applied to a roll of antenna stock. In the exemplary process, denoted by the general reference character 500, roll of antenna stock 502 comprising a plurality of antennas 507 is unwound in processing equipment. The roll may comprise a single antenna or multiple antennas in the cross roll direction. In the exemplary embodiment shown, the roll has four antennas in the cross-roll direction. The roll of PIC stock 504 is unwound, each PIC is placed into contact with each antenna, and the PIC is transferred to the roll of antenna stock 514. Adhesive may be applied to either PIC stock 504 or antenna stock 514 in accordance with techniques known in the art.

Figure 6:
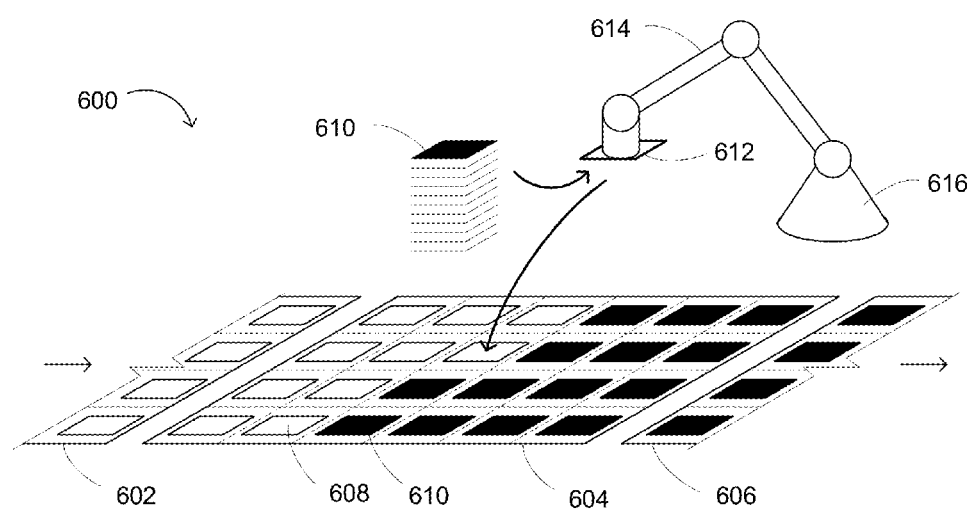
FIG. 6 shows an exemplary process utilizing pick-and-place processing.

Another embodiment of the manufacturing method is shown in FIG. 6. This embodiment is a pick-and-place process generally denoted by the general reference character 600. Sheets of antenna substrate 602 are fed toward a robotic placement station where singulated/divided printed integrated circuit carriers, or PICs, 610 are attached to antenna 608, resulting in a wireless (e.g., RFID) device 610. A robotic machine generally comprising a base and/or control unit 616, an arm 614, and a suction or picking device 612, picks up PIC 610 by maneuvering the arm 614 to the location of PIC 610, picking up the PIC and placing the PIC onto an antenna 608. Attach steps, including those processes discussed herein, may be performed prior to PIC placement as desired (e.g., the application of one or more adhesives on the PIC or the antenna). Also, attach steps may be performed after PIC placement as desired (e.g., applying heat and/or pressure to the PIC and antenna to facilitate adhesion, bump-bonding, wire-bonding, ultrasonic bonding, welding, soldering or crimping). The workpiece sheet 604 is generally stationary to facilitate an accurate placement operation; however, as lower tolerances are required in this inventive approach, one can appreciate embodiments where sheet 604 may be moving. Once all antennas on sheet 604 have PICs placed on them, sheet 604 advances to the location of completed sheet 606, and blank sheet 602 advances to the location of workpiece sheet 604.

In some embodiments of the exemplary method, the manufactured devices may be customized at the integrated circuit level (IC) to embed unique identifiers (e.g., a barcode equivalent) and/or response characteristics (e.g., unique time delay in TTF anti-collision schemes using conventional approaches such as those utilizing read-only memory [ROM], one-time programmable [OTP] fuses, and electrically-erasable programmable ROM [EEPROM] elements). Alternative approaches to customization utilizing maskless patterning techniques which can be quickly adapted to various applications by changing software parameters can be employed. Examples of maskless patterning techniques include laser patterning and inkjetting, using metal nanoparticle- and/or liquid silane-based inks (see, e.g., U.S. patent application Ser. Nos. 12/131,002, 12/114,741, 12/109,338, 11/842,884, 11/888,949, 11/888,942, 11/452,108, 11/243,460, 11/203, 563, 11/084,448, 10/956,714, 10/950,373, and/or 10/789, 317, respectively filed on May 30, 2008, May 2, 2008, Apr. 24, 2008, Aug. 21, 2007, Aug. 3, 2007, Aug. 3, 2007, Jun. 12, 2006, Oct. 3, 2005, Aug. 11, 2005, Mar. 18, 2005, Oct. 1, 2004, Sep. 24, 2004, and Feb. 27, 2004, and U.S. Pat. Nos. 7,314,513, 7,294,449, 7,286,053, 7,276,385 and/or 7,152, 804).

It should be appreciated that the inventive manufacturing process enables other manufacturing methods that might otherwise not be possible due to the lower accuracy of placement required when using printed integrated circuits.

An Exemplary Method of Reading the Present RFID Tags

The present invention further relates to method of detecting an item or object in a detection zone comprising the steps of: (i) causing or inducing a current in the present device sufficient for the device to radiate detectable electromagnetic radiation (preferably at a frequency that is an integer multiple or an integer divisor of an applied electromagnetic field), (ii) detecting the detectable electromagnetic radiation, and optionally, (iii) processing information conveyed by the detectable electromagnetic radiation. Generally, currents and voltages are induced in the present device sufficient for the device to radiate detectable electromagnetic radiation when the device is in a detection zone comprising an oscillating electromagnetic field. This oscillating electromagnetic field is produced or generated by conventional EAS and/or RFID equipment and/or systems. Thus, the present method of use may further comprise the step of (iv) transporting or transmitting information from the present device (or sensor) back to a reading device, or (prior to step (i)) attaching or affixing the present device to an object or article (e.g., an identification card, packaging for goods to be shipped, etc.) to be detected, or otherwise including the present device in such an object, article or packaging therefor.

The present tags are designed at least in part to work with electronic identification and/or security systems that sense disturbances in radio frequency (RF) electromagnetic fields. Such electronic systems generally establish an electromagnetic field in a controlled area, defined by portals through which articles must pass in leaving the controlled premises (e.g., a retail store, library, etc.) or a space in which the article must be placed to be read and identified. A tag having a resonant circuit is attached to each such article, and the presence of the tag circuit in the controlled area is sensed by a receiving system that detects the tag and processes information obtained therefrom (e.g., determines unauthorized removal of an article or the identity of goods in a container labeled with the tag). Most of the tags that operate on these principles are single-use or disposable tags, and are therefore designed to be produced at low cost in very large volumes.

Alternatively, the present tag may take the form of a sensor, the RF signal modulation characteristics and/or properties of which may change as the characteristics and/or properties of the object or article to which it is attached change. For example, the present sensor may be attached to a stainless steel (or other metal) object, structure or surface. As the properties of the object, structure or surface change (e.g., the steel oxidizes, a metal having electromagnetic properties becomes magnetized or carries a minimum threshold electrical current, or the object or surface [regardless of its composition] changes temperature by a predetermined difference or a threshold amount), the characteristics and/or properties of the RF signal radiated, reflected or modulated by the present sensor also change in a detectable manner.

The present tags may be used (and, if desired and/or applicable, re-used) in any commercial EAS and/or RFID application and in essentially any frequency range for such applications. For example, the present tags may be used at the frequencies, and in the fields and/or ranges, described in Table 1 below:

TABLE 1

Exemplary applications.

| Frequencies | Preferred Frequencies | Range/Field of Detection/ Response | Preferred Range/Field of Detection/ Response | Exemplary Commercial Application(s) |
|---|---|---|---|---|
| 100-150 KHz | 125-134 KHz | up to 10 feet | up to 5 feet | animal ID, car anti-theft systems, beer keg tracking |
| 5-15 MHz | 8.2 MHz, 9.5 MHz, 13.56 MHz | up to 10 feet | up to 5 feet | inventory tracking (e.g., libraries, apparel, auto/ motorcycle parts), building security/access |
| 800-1000 MHz | 868-928 MHz | up to 30 feet | up to 18 feet | pallet and shipping container tracking, shipyard container tracking |
| 2.4-2.5 GHz | about 2.45 GHz | up to 30 feet | up to 20 feet | auto toll tags |

The present invention thus also pertains to article surveillance techniques wherein electromagnetic waves are transmitted into an area of the premises being protected at a fundamental frequency (e.g., 13.56 MHz), and the unauthorized presence of articles in the area is sensed by reception and detection of electromagnetic radiation emitted by the present device 100. This emitted electromagnetic radiation may comprise second harmonic or subsequent harmonic frequency waves reradiated from sensor-emitter elements, labels, or films comprising the present device that have been attached to or embedded in the articles, under circumstances in which the labels or films have not been deactivated or otherwise modified for authorized removal from the premises.

CONCLUSION/SUMMARY

Thus, the present invention provides sensor, EAS, RF and/ or RFID tags and devices having printed integrated circuitry and an affixed antenna and/or inductor, and methods for their manufacture and use. The identification device generally comprises (a) printed integrated circuitry on a first substrate; (b) first and second pads on the first substrate and/or the printed integrated circuitry, electrically coupled to the printed integrated circuitry; and (c) an antenna and/or inductor on a second substrate comprising a conductive line having first and second ends thereon, the first and second ends being in electrical communication with first and second pads, respectively. The method of manufacture for a single device generally comprises the steps of (1) printing integrated circuitry having a plurality of first pads on a first substrate; (2) forming an antenna and/or inductor having a plurality of second pads on a second substrate; and (3) attaching at least two of the first pads of the printed integrated circuit to corresponding second pads of the antenna and/or inductor. The method of manufacture for multiple devices generally comprises the steps of (A) forming a plurality of printed integrated circuits on a first substrate stock to form a PIC stock; (B) forming a plurality of antennas and/or inductors on a second substrate stock to form an antenna stock; and (C) attaching the PIC stock to the antenna stock. The method of use generally comprises the steps of (i) causing or inducing a current in the present device sufficient for the device to radiate, reflect or modulate detectable electromagnetic signals; (ii) detecting the detectable electromagnetic radiation; and optionally, (iii) processing information conveyed by the detectable electromagnetic radiation. Optionally, the method of use may further comprise the step of (iv) transporting or transmitting information from the present device (or sensor) back to a reading device.

The present invention advantageously provides a low cost RF and/or RFID tag capable of standard applications and operations using conventional RF, RFID and/or EAS equipment and systems. By reducing the number of expensive and/or low throughput attachment steps, as well as reducing the cost of fabricating the active electronics, a low cost tag may be produced by directly printing or otherwise forming the circuitry on a carrier that is then relatively cheaply attached at relatively low accuracy to an inductor/carrier.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An identification device, comprising:
    a) printed integrated circuitry on a first substrate, the printed integrated circuitry comprising a plurality of electrically active devices, the plurality of electrically active devices including a plurality of thin films, the plurality of thin films comprising a lowest layer in physical contact with a surface of said first substrate, a first successive layer on the lowest layer, and a second successive layer on the first successive layer, wherein the lowest layer and the first and second successive layers taken together comprise an insulating thin film, a metal thin film, and a semiconductor thin film and at least one of the lowest layer and the first and second successive layers is a printed thin film;
    b) first and second pads on the first substrate and/or the printed integrated circuitry, the first and second pads electrically connected to the printed integrated circuitry, at first and second locations, respectively; and
    c) a single-layer antenna and/or inductor on a second substrate consisting essentially of a conductive line having a first and second ends thereon, the first and second ends being physically connected to the first and second pads, respectively.

2. The device of claim 1, wherein the printed integrated circuitry comprises CMOS circuitry.

3. The device of claim 1, wherein the printed integrated circuitry comprises a plurality of printed layers.

4. The device of claim 1, wherein the first substrate comprises a glass, a polyimide, a glass/polymer laminate, a high temperature polymer, or a metal foil.

5. The device of claim 1, wherein the first substrate is flexible.

6. The device of claim 1, wherein the antenna and/or inductor comprises a metal.

7. The device of claim 1 wherein the second substrate comprises glass, a glass/polymer laminate, or a high temperature polymer.

8. The device of claim 1, wherein the antenna and/or inductor is on a surface of the second substrate facing toward the first substrate.

9. The device of claim 1, wherein the printed integrated circuitry is facing toward the second substrate.

10. A method of manufacturing an identification device, comprising:
    a) forming printed integrated circuitry on a first substrate, the printed integrated circuitry comprising a plurality of electrically active devices, the plurality of electrically active devices including a plurality of thin films, the plurality of thin films comprising a lowest layer in physical contact with a surface of said first substrate, a first successive layer on the lowest layer, and a second successive layer on the first successive layer, wherein the lowest layer and the first and second successive layers taken together comprise an insulating thin film, a metal thin film, and a semiconductor thin film and forming the printed integrated circuit comprises printing at least one of the lowest layer and the first and second successive layers;
    b) forming first and second pads electrically connected to the printed integrated circuitry at first and second locations, respectively;
    c) forming a single-layer antenna and/or inductor consisting essentially of a conductive line having first and second ends on a second substrate; and
    d) physically connecting the first and second pads to the first and second ends of the single-layer antenna and/or inductor, respectively.

11. The method of claim 10, wherein physically connecting the first and second pads to the first and second ends comprises applying a conductive adhesive to at least the first and second pads or the first and second ends.

12. The method of claim 10, wherein physically connecting the first and second pads to the first and second ends comprises bump-bonding, ultrasonic bonding, welding, soldering, or crimping.

13. The method of claim 10, wherein forming the single-layer antenna and/or inductor comprises printing the conductive line on the second substrate.

14. The method of claim 10, wherein forming the single-layer antenna and/or inductor comprises:

a) printing an antenna precursor layer on the second substrate; and b) plating a bulk metal conductor onto the antenna precursor layer.

15. The method of claim 10, further comprising applying a non-conductive adhesive to at least one of the first substrate and the second substrate.

16. The method of claim 10, wherein forming the printed integrated circuitry comprises printing at least one layer of a first material in a first pattern on the first substrate.

17. The method of claim 16, wherein the first material comprises a semiconductor precursor or a metal precursor.

18. A method of manufacturing radio frequency identification devices, comprising:

a) forming a plurality of printed integrated circuits on a first substrate stock to form a printed integrated circuit (PIC) stock, the printed integrated circuit stock comprising a plurality of electrically active devices, the plurality of electrically active devices including a plurality of thin films, the plurality of thin films comprising a lowest layer in physical contact with a surface of said first substrate, a first successive layer on the lowest layer, and a second successive layer on the first successive layer, wherein the lowest layer and the first and second successive layers taken together comprise an insulating thin film, a metal thin film, and a semiconductor thin film, and forming the plurality of printed integrated circuits comprises printing at least one of the lowest layer and the first and second successive layers;

b) forming a plurality of single-layer antennas and/or inductors on a second substrate stock to form an antenna stock, each of the plurality of single-layer antennas and/or inductors having first and second opposed ends; and c) attaching the PIC stock to the antenna stock, each of the plurality of PICs being physically connected at first and second locations to the first and second ends of a corresponding one of the plurality of single-layer antennas, respectively.

19. The method of claim 18, wherein each of the first and second substrates comprises sheet stock.

20. The method of claim 18, wherein each of the first and second substrates comprises roll stock.

21. The method of claim 18, wherein one of the first and second substrates comprises sheet stock and the other of the first and second substrates comprises roll stock.

22. The method of claim 18, further comprising applying a backing material onto the plurality of printed integrated circuits.

23. The method of claim 18, further comprising removing a portion of the first substrate from the PIC stock to create a plurality of pads.

24. The method of claim 18, further comprising dividing the PIC stock.

25. The method of claim 18, further comprising, after attaching the PIC stock to the antenna stock, dividing the antenna stock.

26. The method of claim 18, further comprising forming one or more rolls of PIC stock from the PIC stock.

27. The method of claim 18, wherein attaching the PIC stock to the antenna stock comprises a sheet-to-sheet process, a roll-to-roll process, a pick-and-place process, or a tape-and-reel process.

28. The method of claim 18, wherein forming the plurality of printed integrated circuits on the first substrate stock comprises printing each of the plurality of layers of the printed integrated circuits.

29. The method of claim 18, wherein forming the plurality of single-layer antennas and/or inductors comprises printing the plurality of antennas and/or inductors.

30. The method of claim 18, wherein each printed integrated circuit in the plurality of printed integrated circuits comprises first and second pads, and each single-layer antenna and/or inductor in the plurality of single-layer antennas and/or inductors comprises first and second ends, and attaching the PIC stock to the antenna stock comprises physically connecting the first and second pads to the first and second ends.

31. The method of claim 30, wherein the first and second pads are physically connected to the first and second ends by a process that comprises applying a conductive adhesive to the first and second pads or the first and second ends.

32. The method of claim 30, wherein the first and second pads are physically connected to the first and second ends by a process that comprises bump-bonding, ultrasonic bonding, welding, soldering, or crimping.

33. The method of claim 18, wherein forming a plurality of printed integrated circuits comprises providing each printed integrated circuit with a unique identifier.

34. A method of reading an identification device, comprising:

a) causing or inducing a current in the device of claim 1 sufficient for the device to radiate, reflect or modulate a detectable electromagnetic signal; and b) detecting said detectable electromagnetic signal.

35. The method of claim 34, further comprising the step of processing information conveyed by the detectable electromagnetic radiation.

36. The method of claim 34, further comprising the step of attaching or affixing the present device to an object to be detected.

* * * * *